INVENTORS
M.E. BROOKS
C.D. THOMPSON
C.R. CHEW

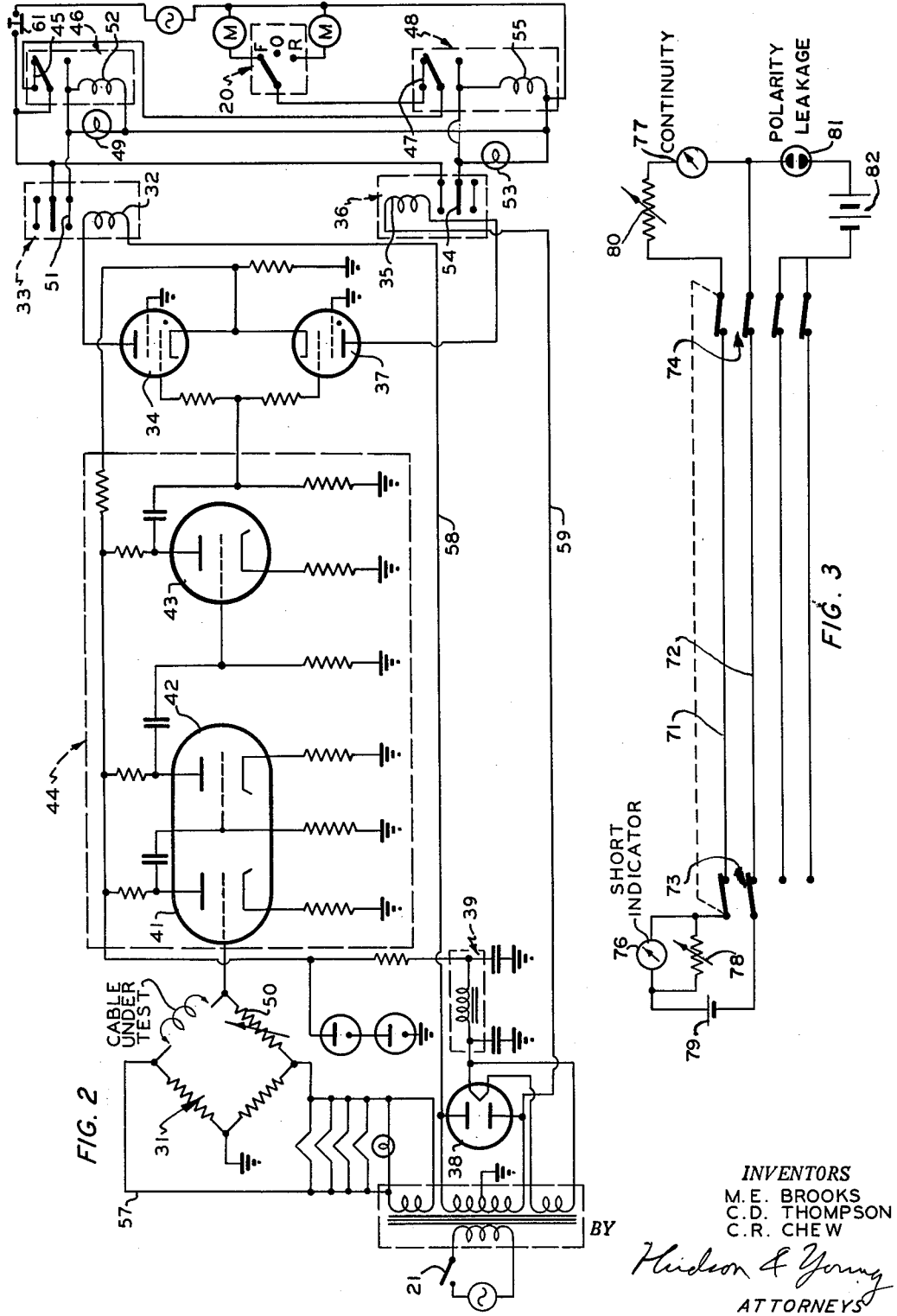

United States Patent Office 3,131,347
Patented Apr. 28, 1964

3,131,347
CABLE TESTING SYSTEM HAVING STRESSING MEANS FOR DETECTING OPEN AND SHORT CIRCUITS
Melvin E. Brooks, Clyde R. Chew, and Carl D. Thompson, all of Bartlesville, Okla., assignors to Phillips Petroleum Company, a corporation of Delaware
Filed Oct. 9, 1961, Ser. No. 155,519
2 Claims. (Cl. 324—51)

This invention relates to determining circuit defects in conductors, especially multi-conductor cables. In one aspect, the invention relates to a method for testing a conductor by passing the conductor through a testing zone while subjecting it to stressing and bending and automatically stopping the passage of the conductor and actuating an indicator upon the occurrence of a circuit defect. In another aspect, the invention relates to conductor testing apparatus including means for connecting the conductor into a test circuit and for passing the conductor through a testing zone while subjecting it to stressing and bending and means automatically actuated upon the occurrence of a circuit defect to stop the passage of the conductor and actuate an indicator.

In seismograph exploration operations periodically it is necessary to test the cables used to connect the seismic detectors with the recording equipment to avoid errors which may necessitate repetition of costly field operations or which may increase the cost of such operations due to the loss of time when defects are discovered in the field. Such cables sometimes develop defects which are evidenced only when the cable is stressed or bent.

An object of our invention is to provide an improved method for locating circuit defects in conductors, especially multi-conductor cables.

Another object of our invention is to provide automatic conductor-testing apparatus.

Another object of our invention is to provide means for automatically stressing and bending a cable while testing for circuit defects and for automatically indicating the type of defect and its location.

Other aspects, objects and the advantages of our invention are apparent in the written description, the drawing and the claims.

According to our invention there is provided a method for testing a conductor by connecting the conductor in a test circuit, passing it through a testing zone while concurrently stressing and bending it and automatically stopping the passage through the testing zone and actuating an indicator when a circuit defect occurs. Our invention is especially applicable to testing a cable comprising a plurality of conductors in which case the conductors preferably are connected in series with each other and in a test circuit. Preferably the test circuit is a bridge to which an alternating current or voltage is applied, the output of the bridge being amplified and applied to the control grids of a pair of thyratron tubes which have an alternating current potentials applied to their anodes, the potentials being substantially 180° out of phase. Thus, one thyratron is fired when an increase in resistance occurs in the conductors, as due to an open circuit, while the other is fired when a decrease in resistance occurs, as for example when a short occurs.

Also according to our invention, there is provided improved conductor-testing means including means to connect a conductor into a test circuit, driving means for moving the conductor through a test zone and means for concurrently stressing and bending the conductor and means actuated automatically upon the occurrence of a circuit defect in the conductor to stop the driving means and actuate an indicator. Separate indicators are used for indicating a short circuit and an open circuit. Where the conductor being tested comprises one of a plurality of conductors in a cable, the conductors are connected in series in the test circuit. We have found that an especially suited apparatus results when the test circuit is an alternating current bridge with the conductor to be tested forming one leg of the bridge and the output of the bridge is supplied to an amplifier connected in turn to the control grids of a pair of thyratron tubes, the anodes of which are connected with sources of alternating current potential substantially 180° out of phase, and first and second relays actuated by the tubes are used to actuate the indicators and the shutdown means. A mechanism comprising first and second reels and a plurality of idler pulleys arranged to flex the conductor in two planes and driving means for the reels is especially well suited to pass the conductor through the testing zone while concurrently stressing and bending it.

In the drawing, FIGURE 1 is a schematic illustration of cable testing apparatus in operation.

FIGURE 2 is a schematic circuit diagram of a test circuit.

FIGURE 3 is a schematic circuit diagram illustrating preliminary testing of the cables.

Figure 1:
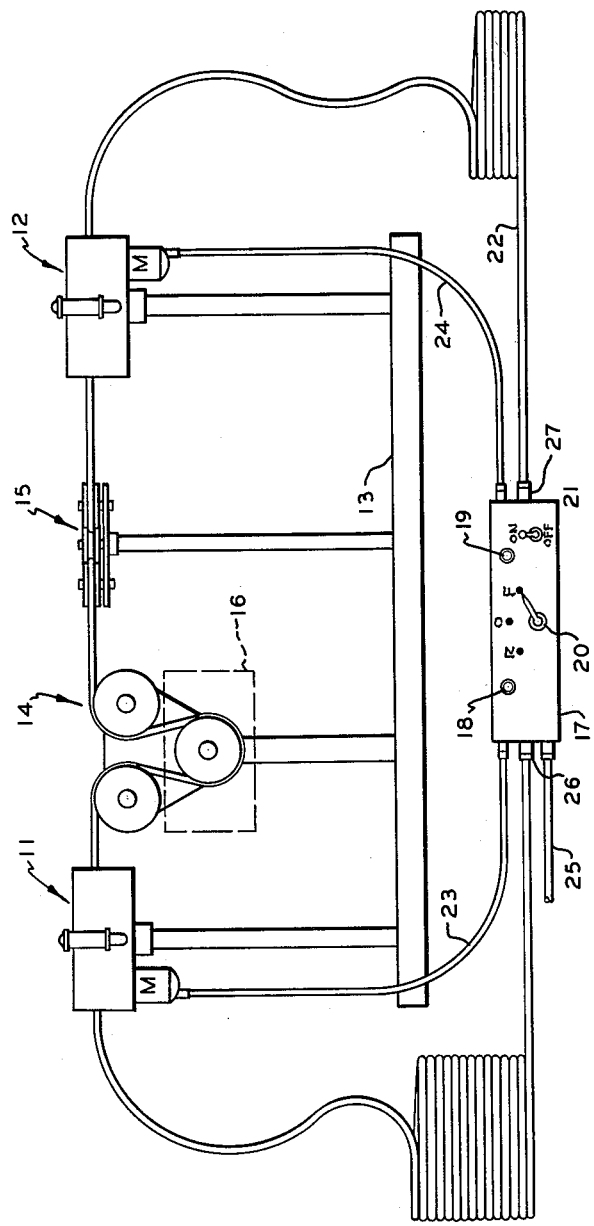

As illustrated in FIGURE 1, cable-pulling device 11 and cable-pulling device 12 are mounted on a platform 13 near the ends thereof. Between devices 11 and 12 are idler pulley assemblies 14 and 15 mounted on suitable supports. Each of the cable-pulling devices 11 and 12 includes a pair of rubber driving wheels, one of which is driven by an electric motor, mounted to turn in a common plane with their treads adjacent at one point, and suitable guides to direct the cable between the driving wheels. Thus, it is seen that when the motor for one of the cable-pulling devices is energized and a cable is fed between the driving wheels further rotation of the motor and the wheels pulls the cable through the device. The motor of device 12 is adapted to pull the cable to the right in FIGURE 1 while the motor of device 11 is adapted to pull the cable to the left in this figure.

Each of the idler pulley assemblies comprises three pulleys mounted in triangular arrangement as illustrated. Assembly 14 is mounted with the plane of the pulleys vertical while assembly 15 is mounted with the plane of the pulleys horizontal. If desired, one of the assemblies or a portion thereof can be enclosed in a tank so that the cable is immersed in water while being tested. This is indicated by the dotted line 16.

A control panel 17 provides space for mounting short indicator light 18, open circuit indicator light 19, direction control switch 20 and on-off switch 21. Suitable connections 26 and 27 are provided for connecting the two ends of the cable 22 to be tested, power leads 23 and 24 to the two motors and 25 to a power supply (not shown). In operation, cable 22 is threaded through cable-pulling device 11, idler pulley assemblies 14 and 15, and cable-pulling device 12 and connected to the two connections 26 and 27 at either side of control panel 17. Switch 21 is moved to the "on" position and direction control switch 20 turned to the "forward" or "F" position. This actuates the driving motor of cable-pulling device 12 thus pulling the cable through the apparatus causing it to be flexed in two directions in one plane by assembly 14 and in two directions in a plane at 90° in assembly 15. If while being pulled through the apparatus a point is reached at which the flexing and stressing causes a short to develop, indicator light 18 lights and the motor of device 12 is automatically shut off. Similarly, if an open circuit occurs in the cable the motor is shut off and open circuit indicator light 19 comes on. Since the short or open circuit occurs while the cable is being flexed, it can easily be isolated in a relatively short section of the long cable. As indicated above, if it is desired to test the cable under water, tank 16 is provided and is filled with water so that every portion of the cable passes through while being flexed.

FIGURE 2 is illustrates a preferred control circuit. Alternating current is supplied to bridge circuit 31 which includes the cable being tested as one leg thereof. Suitable connections are provided in the connections 26 and 27, see FIGURE 1, to place all of the conductors of the cable being tested in series and in one leg of bridge circuit 31. An alternating current voltage is applied to coil 32 of relay 33 and to the plate of a thyratron tube 34. An A.C. voltage 180° out of phase with the voltage supplied to the plate of tube 34 is supplied through coil 35 of relay 36 and to the plate of thyratron tube 37. A D.C. voltage is supplied from rectifier 38 through filter 39 to the plates of tubes 41, 42 and 43 of amplifier 44. Current is supplied through contact 45 of relay 46, through contact 47 of relay 48, and through direction control switch 20 to the forward motor, the motor connected with device 12. Power is supplied similarly to the reverse motor of device 11 when switch 20 is in the reverse position.

Short indicator 49 is connected to contact 51 of relay 33 in parallel with coil 52 of relay 46. Open circuit indicator 53 is connected with contact 54 of relay 36 in parallel with coil 55 of relay 48.

In normal operation a variable resistance 50 is adjusted to balance the bridge with the cable under test with no circuit defect. As the cable proceeds through the testing apparatus, when, due to the flexing and stressing, an open circuit occurs, assuming the instantaneous polarity in conductor 57 to be positive, the polarity likewise will be positive in conductor 58 and negative in conductor 59. The open circuit causes a negative output from the bridge circuit to the grid of tube 41. At the same instant, the grids of both thyratron tubes are driven positive. The plate of tube 37 being negative, no current flows through this tube. On the other hand, the plate of tube 34 being positive, this tube fires, thus actuating relay 33, connecting open circuit indicator 49 through contacts 51 causing the light 49 to come on. At the same time, relay 46 is activated by coil 52, disconnecting the supply of power to the forward motors through contact 45 and locking in open circuit indicator 49 and coil 52. The testing apparatus stops with the open circuit indicator on. When it is desired to continue the operation, reset switch 61 is depressed momentarily, thus breaking the circuit through coil 52 allowing relay 46 to restore and the circuit is in condition for operation as described above.

Similarly, when a short occurs, a positive signal is transmitted from bridge circuit 31, thus driving the grids of thyratron tubes 34 and 37 negative. Therefore, neither tubes can fire. However, on the next half cycle, the polarities of conductors 57, 58 and 59 are reversed. Under this condition the bridge output again supplies a negative signal to the grid of tube 41. At that instant, the grides of both thyratron tubes 34 and 37 are driven positive. Since the plate of tube 37 is now positive, that tube fires, activating relay 36 to connect short indicator 53 and coil 55. Coil 55 operates the contact 47 of relay 48 to disconnect the forward driving motor and lock in the short indicator 53 and coil 55.

The testing procedure described above is utilized only for cables which, in their unstressed condition, indicate no circuit defects. Normally, therefore, each cable is tested as indicated in the circuit of FIGURE 3 prior to the test under stress. Thus, each pair of conductors in turn is connected with a short indicator, a continuity and polarity indicator, and a leakage indicator. That is, as each pair is tested for shorts and continuity all of the other pairs are simultaneously tested for leakage.

In testing the cable with the circuit of FIGURE 3, conductors 71 and 72 are connected through switches 73 and 74 with a short indicator 76 and a continuity indicator 77. A variable resistor 78 is connected in parallel with short indicator 76 and a variable resistor 80 is connected in series with continuity indicator 77. A power supply is indicated at 79. Leakage indicator 81, a neon light, is connected as shown with all of the other conductors of the cable through a power supply 82, and with the short and continuity test circuit. When switches 73 and 74 are closed, if the conductors 71 and 72 are continuous and have no short circuit, short indicator 76 measures the voltage drop across resistor 78 and continuity indicator 77 measures the current in the circuit, resistors 78 and 80 being adjusted so that these indications are within the scale of the instrument. When an open circuit occurs, both indicators have a zero reading while, if a short occurs, indicator 77 falls to a very low value while the indication on short indicator 76 increases. If leakage occurs between the pair under test and the remainder of the conductors, neon tube 81 lights indicating this fact. These tests are repeated with each pair of conductors in turn until all have been tested.

Reasonable variation and modification are possible within the scope of our invention which sets forth method and apparatus for testing conductors, especially multi-conductor cables, by a combination of stressing and bending while testing for shorts or open circuits and automatically stopping the test and actuating an indicator when a circuit defect occurs.

We claim:

1. Means for testing a cable comprising a plurality of conductors, comprising means for connecting said conductors in series in a bridge circuit, whereby said bridge circuit is balanced when there is no defect in said conductors, means for applying a first alternating current potential to said bridge circuit, an amplifier for the output of said bridge circuit, the output of said amplifier being connected to the control grids of a pair of thyratron tubes, means for applying a second alternating current potential substantially in phase with said first alternating potential through the coil of a first relay to the anode of one of said tubes, means for applying a third alternating current potential substantially 180° out of phase with said first alternating current potential through the coil of a second relay to the anode of the other of the said tubes, driving means for passing said cable through a testing zone and means for concurrently stressing and bending said cable, means actuated automatically upon the occurrence of a short circuit in said cable to stop said driving means and actuate a first indicator and means actuated automatically upon the occurrence of an open circuit in said cable to stop said driving means and actuate a second indicator.

2. Means for testing a cable comprising a plurality of conductors, comprising a bridge circuit, means for connecting said conductors in series in one leg of said bridge, whereby said bridge circuit is balanced when there is no circuit defect in said cable, means for applying a first alternating current potential to said bridge circuit, an amplifier for the output of said bridge circuit, a pair of thyratron tubes, means connecting the output of said amplifier to the control grids of said tube, means for applying a second alternating current potential substantially in phase with said first alternating current potential through the coil of a first relay to the anode of one of said tubes, means for applying a third alternating current potential substantially 180° out of phase with said first alternating current potential through the coil of a second relay to the anode of the other of said tubes, a first reel and a driving motor therefor, a second reel and a second driving motor therefor, a plurality of idler pulleys between said reels arranged to bend said cable in two planes as said cable is reeled from one of said reels to the other, means actuated by said first relay to stop both driving motors and actuate a first indicator and means actuated by said second relay to stop both driving motors and actuate a second indicator.

References Cited in the file of this patent
UNITED STATES PATENTS

| | | |
|---|---|---|
| 2,435,266 | Brillhart | Feb. 3, 1948 |
| 2,635,135 | Lamont | Apr. 14, 1953 |